United States Patent Office 3,472,611
Patented Oct. 14, 1969

3,472,611
PREVENTION OF DETERIORATION OF CELLULOSE-BASED RECORDS
William Herbert Langwell, 32 Copse Edge Ave., Epsom, Surrey, England
No Drawing. Filed Aug. 22, 1966, Ser. No. 573,875
Claims priority, application Great Britain, Aug. 27, 1965, 37,051/65
Int. Cl. A61l *13/00*
U.S. Cl. 21—58    8 Claims

ABSTRACT OF THE DISCLOSURE

Method for prevention of acidic deterioration of documents, books, maps and other similar records having a cellulosic base, by exposing such records to penetration by the volatilization products of a non-deliquescent salt, said salt being the reaction product of a normally liquid mono-amine having a dissociation constant $k$ greater than $1.75 \times 10^{-5}$ and an acid having a dissociation constant $k$ not greater than $2.1 \times 10^{-4}$.

---

This invention relates to the prevention of deterioration of documents, books, map and other kinds of records having a cellulosic base, which it is expected will be required to be preserved for a considerable period of time, e.g. a century or longer.

It is current practice to produce paper by processes involving sizing with a mixture of a rosin soap and aluminium sulphate. The latter is the product of a rather weak base with a strong acid and its presence results in most papers showing a noticeably acid reaction.

It is generally accepted that in order to withstand marked deterioration in storage paper should be maintained as near to neutral as possible. It is also known that paper irrespective of the period of manufacture shows a marked tendency to absorb sulphur dioxide from atmospheres in which it is present and to convert it into sulphuric acid which tends to accumulate in the paper.

Thus acidity arising from the method of production and that accumulated from conditions of storage are and will remain, so far as the foreseeable future is concerned, predominant factors in bringing about the deterioration of records of various kinds.

The problem is to devise a method of operation which is convenient for use in offices, libraries and museums where laboratory facilities are not available and it is desirable to employ a method which can be carried out as a routine operation by unskilled staff.

It is an object of the present invention to provide a convenient method of reducing the deterioration of such records as those referred to above and in minimising further deterioration of already old records.

The present invention accordingly provides a method for preventing the deterioration of records having a basis of felted cellulosic fibres which comprises exposing such records, whilst maintained in an enclosed space, to penetration by the products of volatilisation of a non-deliquescent salt of a normally liquid mono-amine which mono-amine has a dissociation constant $k$ greater than $1.75 \times 10^{-5}$ and of an acid having a dissociation constant $k$ not greater than $2.1 \times 10^{-4}$. Preferably said volatile salt is a reaction product of carbon dioxide or acetic acid and a liquid mono-amine. The salt may also be a bicarbonate or carbamate, a formate, or a salt with an organic monocarboxylic acid having 3–5 carbon atoms in the molecule which does not deliquesce, e.g. certain mono-amine butyrates and propionates. In general it is preferred to use the carbonates and acetates and mixtures thereof.

In order that the products of volatilisation penetrate the records to be preserved adequately, exposure thereto should occur in a confined space. Moreover to be effective the mono-amine should be a substantially stronger base than ammonia (dissociation constant $k = 1.75 \times 10^{-5}$) so that the volatilisation products effectively neutralise sulphuric acid forming a salt which is stable at the temperatures and humidities expected to be encountered in storage. The liquid mono-amines used in the form of their non-deliquescent salts are preferably alkylamines having at least six carbon atoms, cycloalkylamines, aralkylamines and non-aromatic type heterocyclic amines such as diisopropylamine, dibutylamine, cyclohexylamine, phenylethylamine, morpholine and piperidine. All such amines are liquid mono-amines having at least six carbon atoms. Preferred salts for use in the method of the invention are the acetates and carbonates of cyclohexylamine, diisopropylamine, di-n-butylamine and piperidine, and mixtures thereof.

Two methods have been found suitable for exposing records to the volatilisation products of the said amines. In one method the salt is introduced into the enclosed space as an impregnant upon an absorbent paper in the form of sheets, strips, or shavings, e.g. a reaction product of the mono-amine and carbon dioxide or acetic acid, or a mixture thereof. This may be done by first impregnating the paper with the selected mono-amine or with a solution thereof in a solvent which is markedly more volatile than the mono-amine, and then exposing the resulting amine-impregnated material to the action of carbon dioxide or acetic acid vapours, or by first producing the reaction product of mono-amine and carbon dioxide, or acetic acid or a mixture thereof, dissolving it in a volatile solvent, such as water or ethanol, and then impregnating the paper with the resulting solution and drying. Instead of paper, other similar materials such as lint or cotton wool may be similarly impregnated. Pieces of the thus impregnated paper, e.g. strips, may be inserted between the pages of a book, between folded sections of a large sheet or within a rolled document, and the books, folded sheets or rolled document then placed in a container provided with closure means, such as a box, which is then closed and when closed is at least reasonably air-tight. Alternatively, the records may be placed within an inner container which is then placed within an at least reasonably air-tight housing. Impregnated strips or shavings or pieces of cotton wool or lint are then placed in a space reserved therefor within the housing. Passage of the volatilisation products of the impregnant into the interior of the inner container causes the contents thereof to be exposed to the action of the said vapours and neutralises any sulphuric acid and/or sulphur dioxide present therein.

When the invention is carried out in this way it may be desirable to control the rate of dissociation and of diffusion of the volatilisation products of the salt into the records, for example, on account of the temperature at which storage is to take place. For example the vapour pressure of the reaction product of cyclohexylamine and carbon dioxide at 25°, 30° and 40° C. is 0.40, 0.74 and 2.24 mm. of mercury respectively and steadily rises with increasing temperature. To reduce loss of impregnant by dissociation or evaporation, or both, the reaction product used as impregnant may be admixed with a film-forming substance soluble in the solvent employed. Thus when using an aqueous solution of a mono-amine salt as impregnant there may be used as the film-forming substance hydroxyethyl cellulose, gum arabic or a water-soluble polyvinyl alcohol or, in the case of an ethanol solution of mono-amine salt, an alcohol-soluble polyamide or ethyl cellulose. The absorbent paper is then impregnated with the resulting solution containing both mono-amine salt and film-former. Alternatively, after impregnating the sheets, strips or shavings with the amine reaction product there may be applied to selected areas of the surface of the impregnated material a solution of a film-forming substance or a film of molten waxy material in order to reduce the rate of loss of amine impregnant.

In the case of impregnated sheets, strips or shavings it may also be desirable to have present suitable means for indicating when the impregnant is substantially exhausted. An indicator dye which changes colour may be used for this purpose, at least the greater part of the change in colour occurring between the pH values 6.0 and 9.5, preferably between 6 and 8. Thus alpha-naphthol-benzein changes from green to yellow, ortho-cresolphthalein from red to colourless, para-xylenol blue from blue to yellow, tropaeolin 000 from red to yellow and bromthymol blue from blue to yellow within this range. A solution of one of these or other substance behaving similarly together with an humectant such as glycerine may be applied as a spot indicator to selected areas of the surface of the impregnated material in any desired pattern. Exhaustion of impregnant is then indicated by colour change.

In the second method of carrying out the invention previously prepared reaction product of carbon dioxide, acetic acid or other suitable acid and the selected mono-amine or mixture of mono-amines is introduced into an enclosed space in the form of sealed holder such as an envelope or sachet formed from paper or a less permeable material such as a film of a polyester or a polyolefin. The reaction product may be used in powder or tabletted form. Tablets may be placed within a suitable holder within the enclosed space without recourse to an envelope or the like. Paper used for such envelopes may have had its permeability modified by suitable pretreatment, for example, with a thermosetting synthetic resin such as a urea-formaldehyde or a urea-melamine-formaldehyde condensation product. Since the volatilisation products diffuse but slowly through films of polyesters or polyolefins small perforations may be made in the films thereof from which sachets are produced in order to increase the rate of diffusion of the contents of such sachets into the surroundings. The sealed envelopes or sachets are then placed in a box or other housing provided with closure means together with the records, or in one or more spaces adapted to hold such envelopes or sachets.

The rate of volatilisation of a salt may be modified by the presence of an humectant in admixture therewith or in contact therewith. This attracts moisture in an amount sufficient to increase the hydrolysis of the salt. Thus glycerol in an amount of 2–5% of its weight may be admixed with a selected mono-amine prior to impregnating absorbent paper therewith and treatment of the paper with carbon dioxide or acetic acid vapours. As a rule, however, it is preferred to use an amine of greater volatility.

When either of the methods outlined above is practised the amine reaction product gradually volatilises and diffuses throughout the atmosphere surrounding the records of which deterioration is to be prevented. The vapours evolved then penetrate the felted cellulosic fibres and react with any available sulphuric acid there present to form a stable non-volatile mono-amine sulphate. When impregnated papers are placed between the pages of closed books it is found that the amine vapours readily penetrate through the pages and react with any sulphuric acid present therein. Thus by spacing such papers at suitable intervals throughout the pages of a book any sulphuric acid present will become bound as a stable mono-amine sulphate. Occasional renewal of the sheets will ensure maintenance of the desired atmosphere in and about the books or other papers. In this way, the useful life of the books or other records is greatly increased.

A number of tests have been carried out to determine the period over which the materials used in accordance with the invention remain active. This can be done by observing the change in weight when stored under given conditions and making a graph of the change in weight with passage of time. From such a graph the time for volatilisation of 50% of the volatile material can be determined, if necessary, by extrapolation. The expectation of utility can be taken as substantially five times the half life period under the conditions of determination.

The carboxylic acid salts of the mono-amines have a lower order of volatility than the carbon dioxide-amine reaction products. The use of mixtures of a carbon dioxide-mono-amine reaction product and an acetate or propionate will thus enable a heavier initial penetration to be achieved and provide an overall longer life for the amine source especially when it is taken into account that the materials to be used are intended for use within closed containers where substantial partial pressures of the volatilisation products can be expected to be maintained after the initial reaction with acids present in the cellulosic materials has taken place. In many circumstances, it is preferable to use such a mixture of salts rather than to add an humectant to an otherwise less volatile salt.

The following examples illustrate the nature of the invention:

Example 1

The following are stirred together until a homogeneous admixture is obtained:

| | Parts by weight |
|---|---|
| Cyclohexylamine | 95 |
| Water | 5 |
| Hydroxyethylcellulose | 1 |

The mixture is used to impregnate paper weighing 55 g.s.m., with substantially its own weight of the mixture.

The impregnated paper is then passed through a tunnel in which an atmosphere of carbon dioxide is maintained. The rate of passage of the paper is adjusted so that in the emergent paper the cyclohexylamine is substantially wholly reacted with the carbon dioxide.

The resulting product is cut into strips a number of which are placed in a deed box with deeds which it is expected will be required about a century hence.

Other strips are placed between the leaves of a book at intervals of one strip after each twenty leaves. The book is then placed in a box which is closed by a tight-fitting lid. Subsequently tests on leaves of the book showed substantially complete elimination of acidity from the leaves after a sojourn of one month within the box.

Example 2

Impregnated paper is prepared as described in Example 1 and then spotted with an indicator composition made up as follows. One gram of alpha-naphthol-benzein is dissolved in 5 ccs. of alcohol and the resulting solution stirred into a homogeneous admixture of 100 ccs. of methanol and 200 ccs. of glycerine. The freshly spotted paper has green spots which gradually change to yellow as it becomes exhausted.

Example 3

Sheets of impregnated paper are prepared as described in Example 1 and 50% of the surface area thereof is then impregnated with petroleum jelly. Such material may be placed in a separate compartment within a container but is not intended to be in contact with deeds or the like.

This product becomes exhausted more slowly than that of Example 2.

Example 4

Cyclohexylamine carbonate is prepared by passing carbon dioxide into a solution of cyclohexylamine in diethyl ether and separating the salt formed from the ether. The dry product (10 grams) is placed in a paper envelope which is sealed. A second quantity was placed in a waxed paper envelope which was then sealed. The envelopes were placed in a compartment in a deed box containing test papers, the box then being closed. Good results were obtained.

Example 5

Cyclohexylamine carbonate prepared as described in Example 4 is compressed into tablets 0.5 inch in diameter and weighing 0.21 gram each. The tablets are placed in a compartment of a deed box. The box also contained test papers which were found to undergo deacidification within one week.

Example 6

Cyclohexylamine acetate is prepared by adding a stoichiometric proportion of 98% acetic acid to a 10% by weight solution of cyclohexylamine in methanol and the solution of the salt formed used to impregnate paper. Strips of the paper are placed in deed boxes which are closed. Good deacidification of test papers was observed but required longer than the carbonate use din Example 5.

Example 7

Paper is impregnated with cyclohexylamine acetate in the manner described in Example 6 and the paper then spotted with an indicator composition prepared as described in Example 2.

Example 8

Cyclohexylamine acetate is prepared as described in Example 6 after addition to the solution of cyclohexylamine of 5% of its weight of glycerol and used in the same way. The action of the glycerol present as an impurity in the actate is to act as an humectant which increases the rate of volatilisation of the salt. Strips of the paper are placed in deed boxes containing test papers which are then closed. Satisfactory deacidification of the test papers took place.

Example 9

Example 4 is repeated using diisopropylamine in place of cyclohexylamine. Diisopropylamine carbonate has been found to be a very suitable non-deliquescent salt for use in deed boxes. Good results were obtained.

Example 10

Example 4 is repeated using di-n-butylamine in place of cyclohexylamine. Di-n-butylamine carbonate has been found to be a very suitable non-deliquescent salt for use in deed boxes. Good results were obtained.

Example 11

Example 4 is repeated using piperidine in place of cyclohexylamine. Piperidine carbonate has been found to be a very suitable non-deliquescent salt for use in deed boxes. Good results were obtained.

Example 12

The products used in Examples 9–11 were compressed into tablets similar to those described in Example 5 and placed in compartments in deed boxes. Good results were obtained with test papers in all cases.

The carbonates, acetates and formates of dimethylamine and diethylamine have all been tested but have all been found to be deliquescent to a substantial extent: they are thus unsuitable for use for the present purpose.

I claim:
1. A method for preventing the acidic deterioration of documents, books, maps and other similar records having a cellulosic base which comprises exposing such records, while being maintained within an enclosed space, to penetration by the volatilization products of a substantially non-deliquescent salt, said salt being a reaction product of a normally liquid mono-amine having a dissociation constant $k$ greater than $1.75 \times 10^{-5}$ and an acid having a dissociation constant $k$ less than $2.1 \times 10^{-4}$.

2. The method in accordance with claim 1, wherein the acid is an organic monocarboxylic acid having 1–5 carbon atoms, and the amine is selected from the group consisting of alkylamines, cycloalkyl amines, aralkylamines and non-aromatic heterocyclic amines, the amine having at least six carbon atoms.

3. The method claimed in claim 1 in which said records comprise a book and said salt is absorbed upon pieces of absorbent paper which are inserted between pages of said book.

4. The method claimed in claim 1 in which said salt is disposed within a holder therefor located within said enclosed space and said records are disposed within another part of said enclosed space.

5. The method claimed in claim 4 in which said salt is in tablet form.

6. The method claimed in claim 1 in which said salt is selected from the group consisting of the acetate and carbonate salts of said amine and mixtures thereof.

7. The method claimed in claim 6 in which said amine is selected from the group consisting of cyclohexylamine, di-isopropylamine, di-n-butylamine, morpholine and piperidine.

8. The method according to claim 6 wherein the amine is selected from the group consisting of alkylamine, cycloalkyl amines, aralkylamines and non-aromatic heterocyclic amines, the amine having at least six carbon atoms.

References Cited

UNITED STATES PATENTS

| | | |
|---|---|---|
| 2,185,954 | 1/1940 | Ryner. |
| 2,643,177 | 6/1953 | Wachter et al. _____ 117—154 XR |
| 2,653,854 | 9/1953 | Schaar _____ 117—167 XR |
| 2,822,296 | 2/1958 | Barrett et al. _____ 117—154 XR |

MORRIS O. WOLK, Primary Examiner

BARRY S. RICHMAN, Assistant Examiner

U.S. Cl. X.R.

21—2, 7, 76, 109, 2.5; 117—154, 62.1, 87; 252—401, 403